(12) United States Patent
Bangolae et al.

(10) Patent No.: US 7,697,431 B1
(45) Date of Patent: Apr. 13, 2010

(54) MANAGING THE BANDWIDTHS OF VIRTUAL CIRCUITS WHEN THE AGGREGATE BANDWIDTH TO AN ADJACENT DEVICE CHANGES

(75) Inventors: Balaji Lakshmikanth Bangolae, Bangalore (IN); Raghavendra Gopinath, Bangalore (IN); Hrishikesh Vishwas Kulkarni, Bangalore (IN); Jagadeesh Maiya, Bangalore (IN); Pankaj Vyas, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1379 days.

(21) Appl. No.: 10/422,717

(22) Filed: Apr. 25, 2003

(51) Int. Cl.
*H04L 12/28* (2006.01)
(52) U.S. Cl. .................... 370/235; 370/397
(58) Field of Classification Search .......... 370/468
See application file for complete search history.

(56) References Cited

U.S. PATENT DOCUMENTS

| | | | |
|---|---|---|---|
| 6,195,354 B1 * | 2/2001 | Skalecki et al. | 370/395.32 |
| 6,631,135 B1 * | 10/2003 | Wojcik | 370/395.21 |
| 6,775,320 B1 * | 8/2004 | Tzannes et al. | 375/222 |
| 6,826,160 B1 * | 11/2004 | Wang et al. | 370/329 |

OTHER PUBLICATIONS

The ATM Forum Technical Committee; Entitled:"Inverse Multiplexing for ATM (IMA) Specification Version 1.0"; AF-PHY-0086.000; Jul., 1997; Available from www.atmforum.com; (135 Pages).

* cited by examiner

*Primary Examiner*—Seema S Rao
*Assistant Examiner*—Wanda Z Russell
(74) *Attorney, Agent, or Firm*—Patent Capital Group

(57) ABSTRACT

The bandwidth of a virtual circuit is changed when the aggregate bandwidth available on path(s) to an adjacent ATM device (through which the VC is provided) changes. The change of bandwidth may be implemented by changing the QoS parameters associated with the virtual circuits. Thus, for example, when one of the paths becomes non-operational, the bandwidth of a virtual circuit may be reduced in a fair manner.

19 Claims, 6 Drawing Sheets

| Opera-tional Paths | UBR | | ABR | | | | VBR | | | |
|---|---|---|---|---|---|---|---|---|---|---|
| | PCR1 | PCR2 | PCR3 | MCR3 | PCR4 | MCR4 | PCR5 | SCR5 | PCR6 | SCR6 |
| 4 | 10 | 4 | 8 | 0.5 | 10 | 1 | 12 | 1.5 | 10 | 2 |
| 3 | 7.5 | 3 | 6 | 0.5 | 7.5 | 1 | 9 | 1.5 | 7.5 | 2 |
| 2 | 5 | 2 | 4 | 0.4 | 5 | 0.8 | 6 | 1.2 | 5 | 1.6 |
| 1 | 2.5 | 1 | 2 | 0.2 | 2.5 | 0.4 | 3 | 0.6 | 2.5 | 0.8 |

MANAGING THE BANDWIDTHS OF VIRTUAL CIRCUITS WHEN THE AGGREGATE BANDWIDTH TO AN ADJACENT DEVICE CHANGES

BACKGROUND OF THE INVENTION

1. Field of the Invention

The present invention relates to ATM devices (e.g., switches and edge routers) used in telecommunication networks, and more specifically to a method and apparatus for managing the bandwidths of virtual circuits when the aggregate bandwidth to an adjacent device changes.

2. Related Art

Virtual circuits are often provisioned using asynchronous transfer mode (ATM) technology/standards as is well known in the relevant arts. In general, each of several pairs of ATM devices (switches, edge routers, etc.) are connected by corresponding one or more physical paths, and virtual circuits are provided using such connected pairs of ATM devices.

The aggregate bandwidth available from an ATM device to an adjacent ATM is typically shared by several virtual circuits. The bandwidths of virtual circuits generally determine the specific time points at which the cells related to respective virtual circuits are transmitted on the paths. Typically, cells related to virtual circuits with higher allocated bandwidths are provided turns for transmission with a correspondingly higher frequency.

In a prior embodiment, the bandwidth of a virtual circuit may remain unchanged even if the aggregate bandwidth to an adjacent ATM device changes. For example, the aggregate available bandwidth may be reduced as one of the paths becomes non-operational, but the bandwidth of various virtual circuits may remain unchanged. The bandwidth of the virtual circuits may not be similarly increased automatically if the aggregate bandwidth increases.

One problem with such an approach is that at least some of the virtual circuits may not get a fair share of available bandwidth when the aggregate bandwidth to the adjacent ATM device decreases. For example, some of the virtual circuits may hog (use all the available bandwidth) while the rest of the virtual circuits may have limited/no bandwidth to use. As a result, such rest of the virtual circuits may become unusable.

BRIEF DESCRIPTION OF THE DRAWINGS

The present invention will be described with reference to the accompanying drawings, wherein:

FIG. 3 is a table illustrating the QOS parameters with reference to an example in an embodiment of the present invention;

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

An aspect of the present invention enables the bandwidth of a virtual circuit (provided via an adjacent ATM device) to be changed when the aggregate available bandwidth to the adjacent ATM device (through which the virtual circuit is provided) changes. For example, the bandwidth of a virtual circuit may be reduced if the aggregate available bandwidth changes. As a result, the aggregate available bandwidth may be distributed as desired by a designer in potentially a fair manner.

In one embodiment described below, multiple physical paths are provided between a pair of ATM devices, and the aggregate available bandwidth between the two devices may change according to the number of physical paths that are operational. An example protocol which permits such multiple physical paths is described in further detail in a document entitled, "AF-PHY-0086.000: Inverse Multiplexing for ATM (IMA)—version 1.0", available from www.atmforum.com.

The change of bandwidth may be implemented by changing the QoS parameters associated with a virtual circuit. Each QoS parameter type (e.g., peak cell rate, minimum cell rate, sustained cell rate) may be computed individually for all the virtual circuits sharing the corresponding QoS parameter type to change the bandwidth of virtual circuits.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
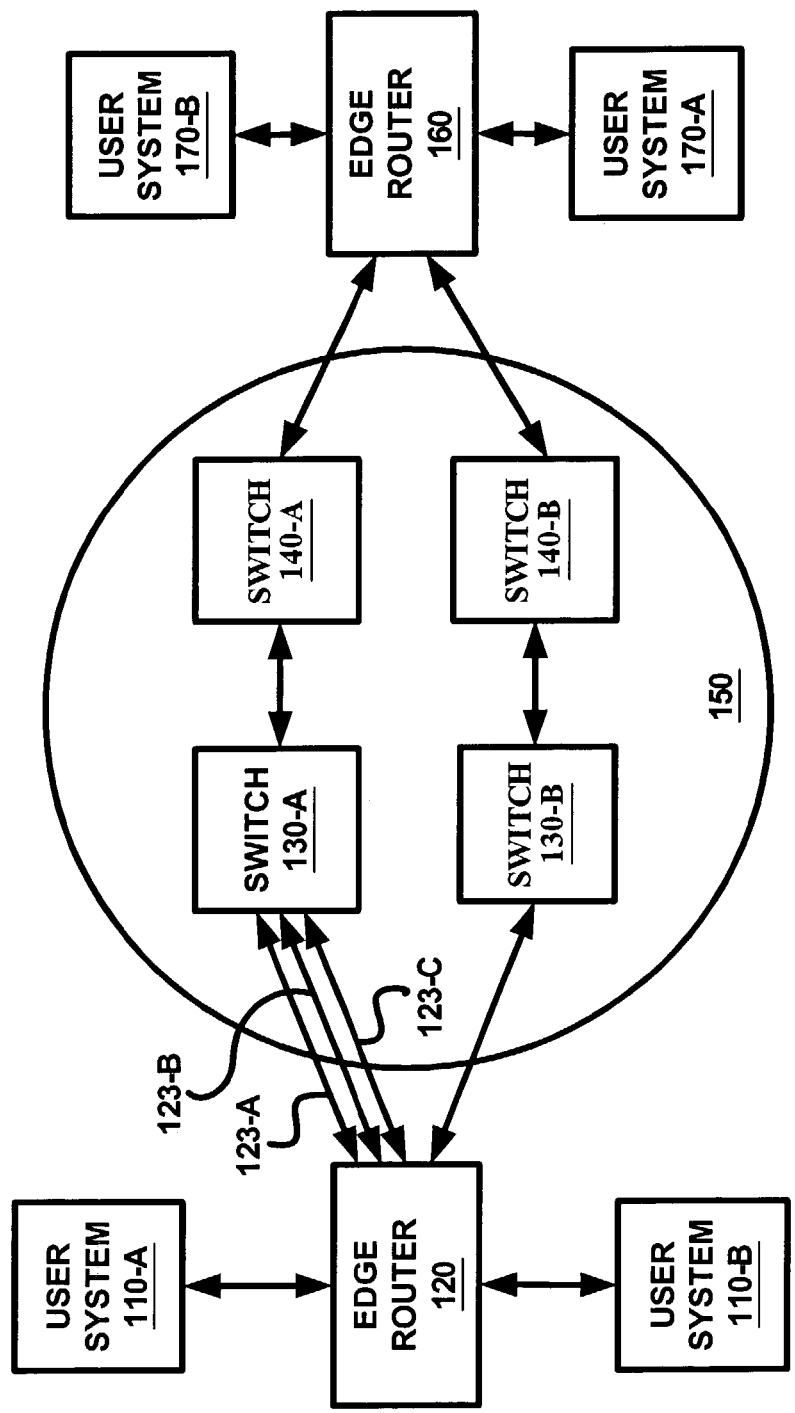
FIG. 1 is a block diagram illustrating an example environment in which the present invention can be implemented.

FIG. 1 is a block diagram illustrating an example environment in which the present invention can be implemented. The environment is shown containing user systems 110-A, 110-B, 170-A and 170-B, edge routers 120 and 160, and switches 130-A, 130-B, 140-A and 140-B. The switches are shown contained within ATM backbone 150. Each component is described below in further detail.

The environment is shown containing a few representative components only for illustration. In reality, each environment typically contains many more components. In addition, for conciseness and clarity, the invention is described with reference to edge router 120 only. However, several aspects are applicable to other edge routers and switches (in general, ATM devices) as well.

User systems 110-A and 110-B communicate with user systems 170-A and 170-B using ATM backbone 150. Each user system (e.g., 110-A) interfaces with the connected (e.g., user system 110-A is shown connected to edge router 120) edge router(s) using a layer 3 protocol such as Internet Protocol (IP). Each user system may correspond to a computer system or workstation, and can be implemented in a known way.

ATM backbone 150 is shown containing switches 130-A, 130-B, 140-A and 140-B. The switches operate consistent with the ATM protocol. Edge router 120 interfaces with user systems 110-A and 110-B using IP protocol, and with switches 130-A and 130-B using ATM.

Edge router 120 is shown connected to switch 130-A using multiple (physical) paths 123-A, 123-B and 123-C. At least some of the virtual circuits may be configured to use the aggregate bandwidth available on all the paths. IMA protocol, noted above, is an example of a protocol which allows the cells related to each virtual circuit to be transmitted on all the paths.

The manner in which the aggregate bandwidth available on paths 123-A, 123-B and 123-C may be used to manage the bandwidth of different virtual circuits is described in further detail below with reference to several examples.

3. Method

Figure 2:
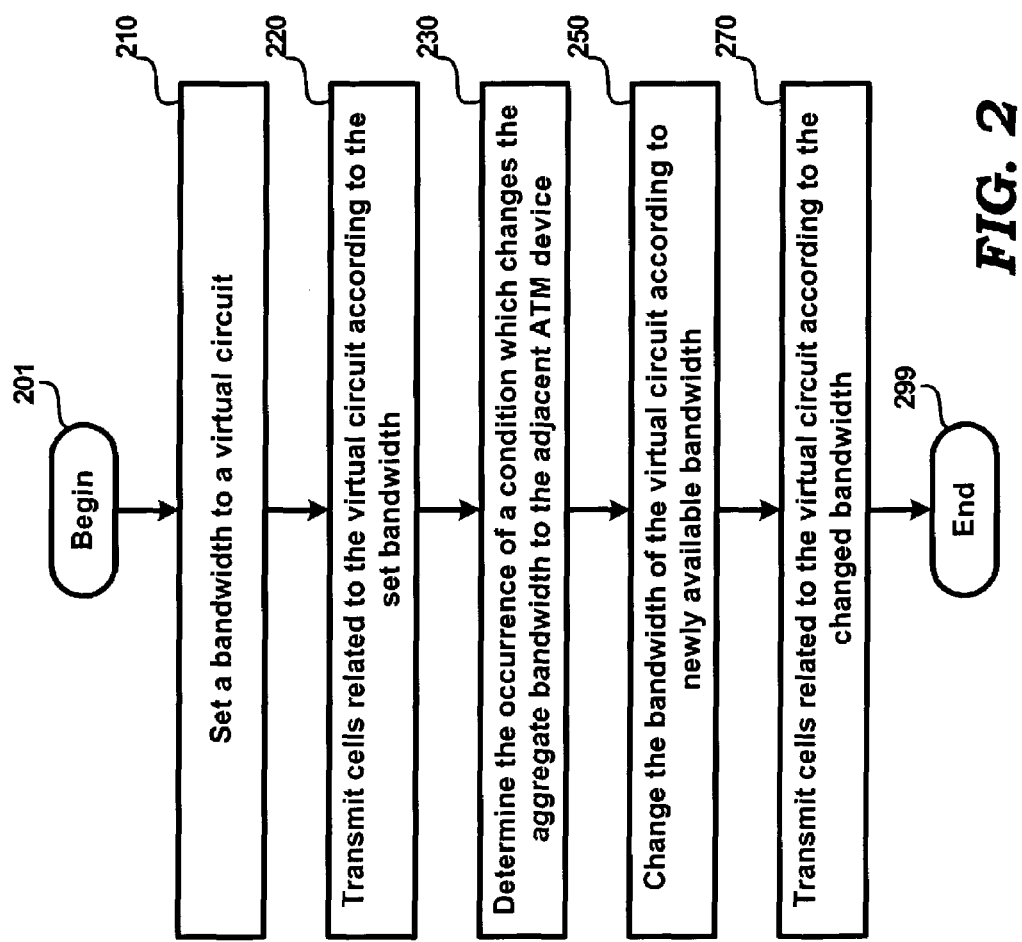
FIG. 2 is a flow chart illustrating the manner in which bandwidth available on multiple paths shared by an virtual circuit can be managed by an edge router in an embodiment of the present invention.

FIG. 2 is a flow-chart illustrating a method using which bandwidth associated with different virtual circuits may be managed, with each virtual circuit sharing the bandwidth available on multiple paths. The method is described with reference to edge router 120 of FIG. 1 for illustration only. However, the method can be implemented in other ATM devices and environments also, and such implementations are contemplated to be within the scope and spirit of several aspects of the present invention. The method starts in step 201, in which control immediately passes to step 210.

In step 210, edge router 120 sets the bandwidth of a virtual circuit. In the situation of FIG. 1, assuming that all the configured paths are operational, the virtual circuit may be set to an amount of bandwidth as specified (configured) by an administrator. In general, the bandwidth is determined based on the type of virtual circuit and the associated QoS parameter values.

In step 220, edge router 120 transmits the cells related to the virtual circuit according to the bandwidth set in step 210. In the IMA based environment of FIG. 1, all the physical paths 123-A, 123-B and 123-C may be used to transmit the cells. The cells may be assigned to the physical paths in a round-robin fashion, and each cell may be transmitted on the assigned path.

In step 230, edge router 120 determines the occurrence of a condition which changes the aggregate bandwidth to an adjacent ATM device (through which the virtual circuit is provided). With respect to the embodiment of FIG. 1, examples of such a condition include change of status of a path from operational to non-operational or vice versa.

In step 250, edge router 120 changes the bandwidth of the virtual circuit according to newly available bandwidth. In an embodiment, the allocated bandwidth of a virtual circuit is reduced if the aggregate available bandwidth is determined to have been reduced. In step 270, edge router 120 transmits the cells related to the virtual circuit according to the changed bandwidth. The method ends in step 299.

By changing the bandwidth of a virtual circuit (in step 250), a desired policy/approach may be implemented when the aggregate bandwidth available on paths 123-A, 123-B and 123-C changes. In an embodiment, the change in bandwidth is controlled by changing the QoS parameter values. The manner in which QoS parameter values can be changed is described below with examples.

4. QoS Parameters

FIG. 3 is a table illustrating the manner in which QOS parameters may be changed for virtual circuits in an embodiment of the present invention. The table is shown containing several columns, with column 301 indicating the number of operational paths. The remaining columns represent the QoS values (in Megabits per second) for 6 virtual circuits, with two virtual circuits of each type (UBR, ABR and VBR).

It may be further appreciated that each of these columns is labeled with a four letter code, with the first three letters indicating the QoS type and the last letter indicating the virtual circuit number within the virtual circuit type. It should be understood that only six virtual circuits of three types are included for illustration. Typical environments contain many more virtual circuits and types, as will be apparent to one skilled in the relevant arts.

Columns 302 and 303 indicate the PCR (peak cell rate) parameter values related to two UBR virtual circuits; columns 304-A and 304-B respectively indicate the PCR and MCR (minimum cell rate) parameter values related to a first ABR virtual circuit; columns 305-A and 305-B respectively indicate the PCR and MCR parameter values related to a second ABR virtual circuit; columns 306-A and 306-B respectively indicate the PCR and SCR (sustained cell rate) parameter values related to a first VBR virtual circuit; and columns 307-A and 307-B respectively indicate the PCR and SCR parameter values related to a second VBR virtual circuit.

Rows 310, 320, 330 and 340 respectively indicate the QoS parameter values for the six virtual circuits when only 4, 3, 2 and 1 paths are operational, assuming that four paths are connected from an ATM device to another ATM device. Thus, row 310 may represent QoS parameter values corresponding to configured (or specified by an administrator) values. As may be readily observed, the parameter values PCR1, PCR2, PCR3, MCR3, PCR4, MCR4, PCR5, SCR5, PCR6 and SCR6 are respectively shown with values of 10, 4, 8, 0.5, 10, 1, 12, 1.5, 10, and 2.

It should be appreciated that the QoS parameter values are chosen merely to illustrate the manner in which the values can be changed. In addition, for simplicity, each of the four paths are assumed to provide equal bandwidth and the new QoS parameter values are computed accordingly.

When the status of a path changes, the PCR values may be computed using the following equation:

$$\text{New PCR of each VC} = (\text{PCR configured} * \text{operative paths}) / \text{total paths} \qquad \text{Eq. (1)}$$

wherein * and / respectively represent multiplication and division operations, operative paths represents the number of paths that are operational, and total paths represents the total number of paths that are present (whether operational or not).

Accordingly, the values in Column 302 are respectively shown changed to 7.5, 5 and 2.5 (from 10) corresponding to 3, 2 and 1 operational paths. The values in other PCR columns (303, 304-A, 305-A, 306-A and 307-A) are similarly explained.

With respect to MCR and SCR values, in an embodiment, MCR and SCR are treated similarly for the purpose of computation of new values since the two parameter types generally represent the allocated bandwidth for the corresponding virtual circuits. Accordingly, the two parameters are commonly referred to as allocated bandwidth in the below description. The manner in which the allocated bandwidth is changed is described below in further detail.

If the sum of allocated bandwidth is less than the active interface bandwidth (the sum of bandwidths of operational paths), the MCR and SCR values are left unchanged. On the other hand, if the sum of the configured bandwidth of all the virtual circuits is greater than the aggregate configured interface bandwidth (i.e., aggregate available bandwidth when all paths are operational), the new allocated bandwidth for each virtual circuit is computed using the following equation:

New allocated bandwidth value of each VC=(Configured Bandwidth*operative paths)/total paths    Eq. (2)

Equation (3), noted below may also be used to determine the new allocated bandwidth if the sum of configured bandwidth (SCB) of all the virtual circuits is greater than the aggregate active interface bandwidth (AAIB) (i.e., aggregate bandwidth of only the operational paths or aggregate available bandwidth). The new allocated bandwidth in such a situation may be computed using the below equation:

New allocated bandwidth value of each VC=(Configured Bandwidth*AAIB)/SCB    Eq. (3)

wherein AAIB and SCB are defined in the above paragraph. However Equation (2) takes precedence over Equation (3) if both the associated results of comparison are true/positive.

Continuing with reference to FIG. 3, the MCR and SCR values are computed assuming the presence of 4 paths, each with a bandwidth of a E1 (i.e., approximately 2 Mbps). As may be appreciated, the SCB equals (0.5+1+1.5+2=5), and the allocated bandwidths in columns 304-B, 305-B, 306-B and 307-B are shown with the corresponding values.

When even one of the paths becomes non-operational, the result of comparison (5>6, wherein 5 represents SCB computed above and AAIB equals 6 corresponding to the aggregate bandwidth of the three operational circuits) associated with Equation (3) continues to be false, and thus the allocated bandwidths are shown as not being changed in row 320. However, when two or three of the paths become non-operational, the MCR and SCR values in rows 330 and 340 are respectively generated by multiplying the corresponding configured parameter value with $4/5$ (wherein 4 equals the aggregate available bandwidth of the 2 operational paths) and $2/5$ as the result of comparison would be determined to be true.

While some of the QoS parameter values are re-computed, some of the QoS parameters may be left unchanged even if the operational status of paths changes. For example, MBS (maximum burst size) may be left unchanged. In addition, it should be understood that other Equations may be used to compute various parameter values. For example, the new PCR may be computed using the following equation (instead of Equation (1) noted above).

New PCR of a virtual circuit=minimum(PCR configured,max_available_rate)    Equation (4)

wherein minimum represents the lesser value,

While the above description provides an example approach, alternative embodiments may be implemented with different approaches to changing the bandwidth of various virtual circuits. For example, different virtual circuits may be provided different priorities and only the bandwidth of virtual circuits with lower priority may be lowered in case of some of the paths becoming non-operational. In addition or in the alternative, weights may be associated with various virtual circuits, and the decrease in bandwidth can be implemented to be proportionate to the corresponding weights.

Thus, the bandwidth of virtual circuits may be changed using the approaches described above. The approaches may be implemented in several embodiments of ATM devices. Example embodiments of edge router 120 and switch are described below in further detail.

5. Edge Router

Figure 4:
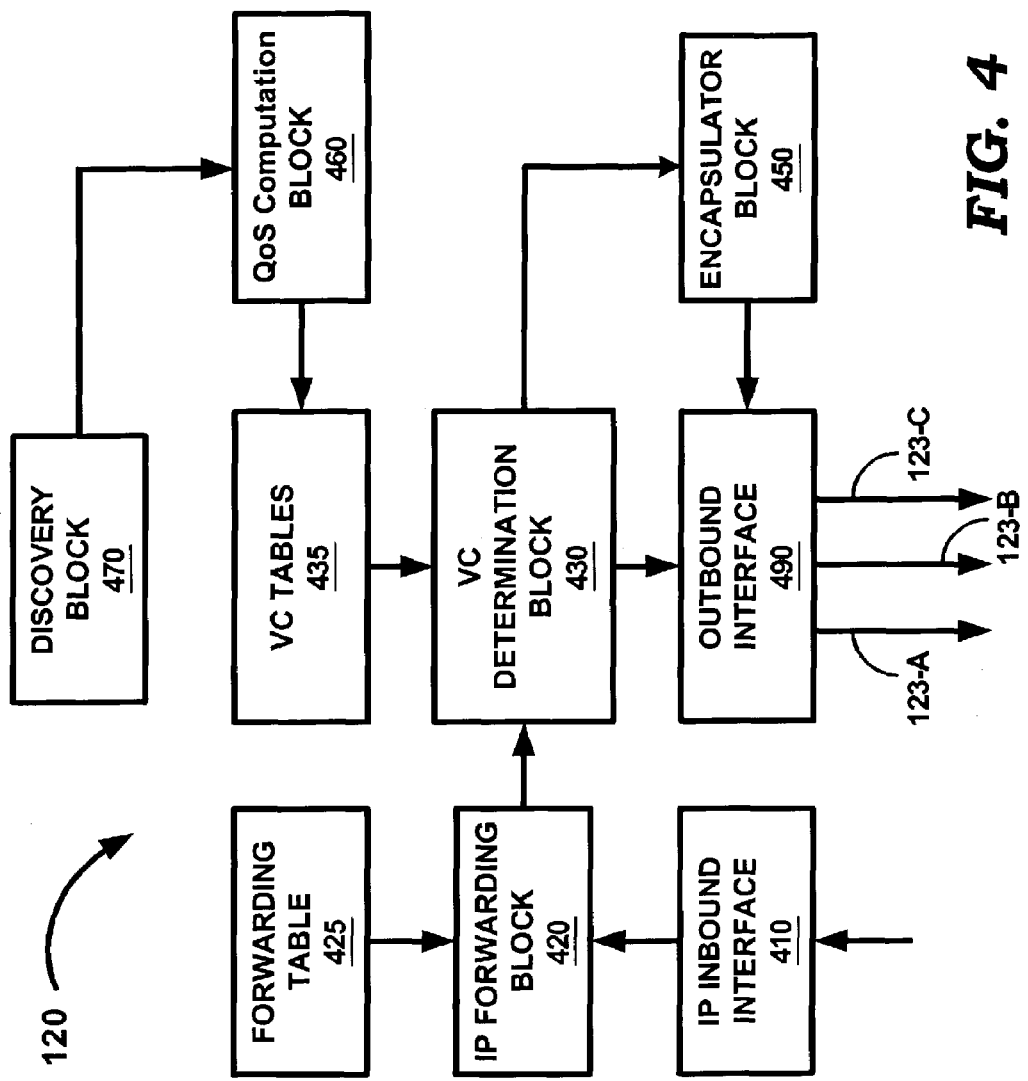
FIG. 4 is a block diagram illustrating the further details of an edge router in an embodiment of the present invention.

FIG. 4 is a block diagram illustrating the details of an embodiment of edge router 120 as relevant to several aspects of the present invention. Edge router 120 is shown containing IP inbound interface 410, IP forwarding block 420, VC determination block 430, encapsulator 450, QoS computation block 460, discovery block 470, and outbound interface 490. Each component is described below in further detail.

IP inbound interface 410 provides the physical, electrical and other protocol interfaces to receive IP packets from user systems 110-A and 110-B. The packets are forwarded to IP forwarding block 410. Similarly, outbound interface 490 provides the physical, electrical and protocol interfaces to transmit IP packets in the form of ATM cells on the virtual circuits between edge routers 120 and 160.

In addition, outbound interface 490 forwards cells related to various virtual circuits on paths 123-A, 123-B and 123-C according to various QoS parameter values received from VC determination block 430. Accordingly, outbound interface 490 may contain any necessary memory/buffers to queue and forward cells according to the QoS values of the respective virtual circuits. IP inbound interface 410 and outbound interface 490 may be implemented in a known way.

IP forwarding block 420 receives an IP packet from IP inbound interface 410, and determines an IP route the packet is to be forwarded on. The destination IP address is compared ("look-up") against entries in forwarding table 425 to determine the manner in which an IP packet is to be forwarded. The destination IP address is used to determine the specific virtual circuit to forward the packet on. Forwarding table 425 may be populated using routing protocols and/or manually in a known way.

VC table 435 stores the various information elements necessary to determine the VPI/VCI information and the interface on which to transmit cells related to an IP packet. In an embodiment, various parameters (e.g., virtual circuit type, QoS parameter values, etc.) used for forwarding the data in the packets are stored in VC table 435.

VC determination block 430 determines the VPI/VCI information and the interface on which to forward a received IP packet. The VPI/VCI and the specific port interface may be determined by accessing the various information elements in VC table 435. In addition, VC determination block 430 may retrieve QoS parameter values present in VC table 435, and the retrieved values are provided to outbound interface 490.

Encapsulator 450 receives each IP packet and encapsulates the data in the form of several ATM cells. The header for each cell is constructed based on a VPI/VCI received from VC determination block 430. The same VPI/VCI may be used to encapsulate all cells of a packet. Outbound interface 490 transmits the resulting cells on paths (123-A, 123-B, and 123-C) according to QoS parameters provided by VC determination block 430 as described above.

Discovery block 470 determines the occurrence of a condition which changes the aggregate available bandwidth on the paths to a next hop ATM device. For example, discovery block 470 may interface with outbound interface block 490 (connection not shown) to determine the change in the status of path(s). Alternatively, internal registers (or other memory elements, not shown) which store data representing the status may be examined for such a determination. Data representing the determined status may be provided to QoS computation block 470.

QoS computation block 460 determines the QoS parameters of each virtual circuit based on the aggregate bandwidth available on the paths. The parameters may be re-computed in response to receiving data from discovery block 470 indicating the change in available bandwidth. The new values may be computed as described in the above section(s). The computed values may be stored in VC table 435 to change the bandwidth of the virtual circuits.

Accordingly, edge router 120 can be implemented to change the bandwidth of various virtual circuits if the aggregate bandwidth on paths (shared by each virtual circuit) changes. The features may be implemented in switches also as described briefly below.

6. Switch

Figure 5:
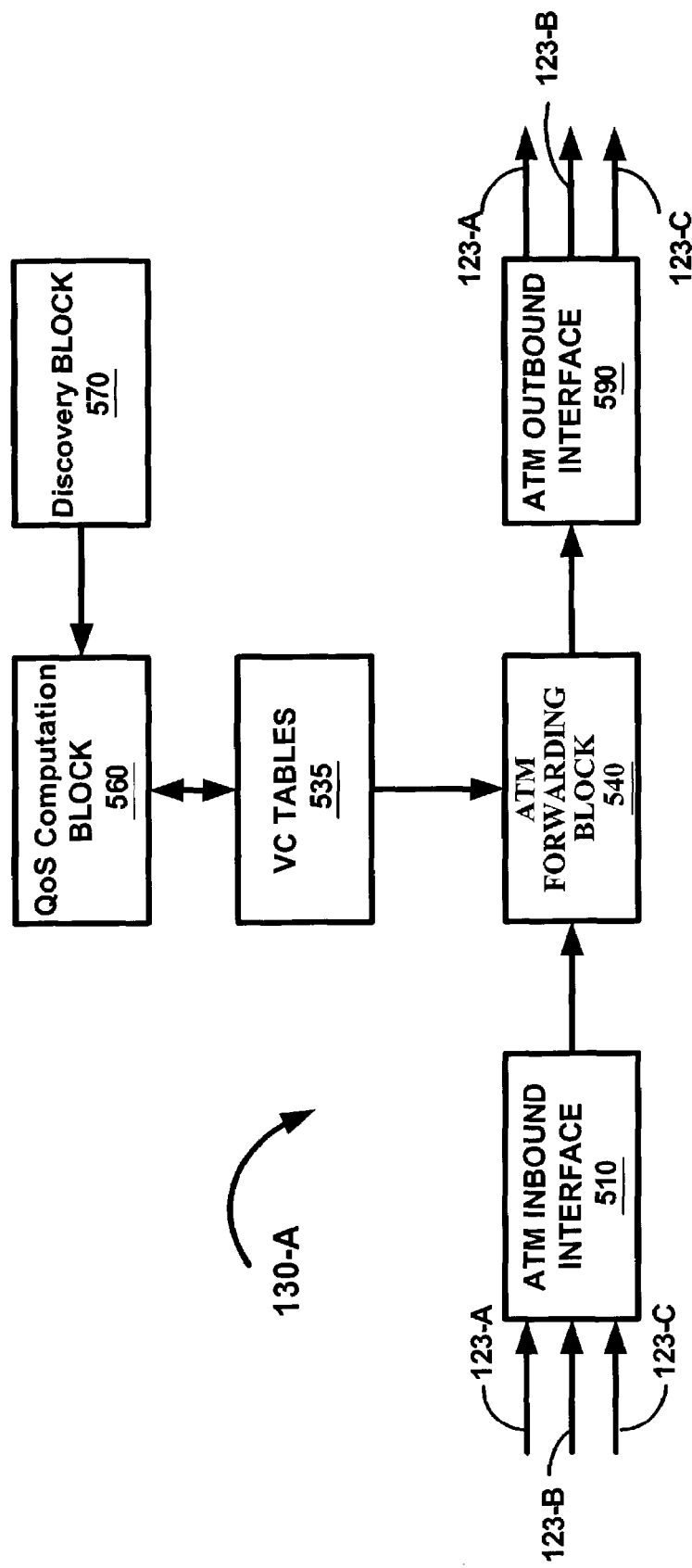
FIG. 5 is a block diagram illustrating the further details of a switch in an embodiment of the present invention.

FIG. 5 is a block diagram containing the details of an embodiment of switch 130-A as relevant to various aspects of the present invention. Switch 130-A is shown containing ATM inbound interface 510, QoS computation block 560, discovery block 570, ATM outbound interface 590, and VC tables 535. Each block is described below in further detail.

QoS computation block 560 and discovery block 570 may respectively be implemented similar to QoS computation block 460 and discovery block 470. As a result, the QoS parameter values may be recompute and stored in VC tables 435 when the aggregate available bandwidth changes to an adjacent ATM device.

ATM inbound interface 510 provides the physical, electrical and other protocol interfaces to receive IP cells on paths 123-A through 123-C. The packets are forwarded to ATM forwarding block 540. ATM inbound interface 510 may be implemented in a known way.

ATM forwarding block 540 determines the new VPI/VCI and port interface on which to forward a received cell. The determination may be performed based on information available in VC tables 535. The cell may then be forwarded using ATM outbound interface 590. ATM forwarding block 540 may be implemented in a known way.

ATM outbound interface 590 provides the physical, electrical and other protocol interfaces to forward cells on paths 123-A, 123-B and 123-C. The cells may be received from ATM forwarding block 540. ATM outbound interface 590 may be implemented similar to outbound interface 490.

It should be understood that various modifications may be made from the description of above without departing from the scope and spirit of the present invention, as will be apparent to one skilled in the relevant arts by reading the disclosure provided herein.

It should be further understood that each feature of the present invention can be implemented in a combination of one or more, of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing edge router 120 with a desired mix of hardware, software and/or firmware. An embodiment implemented substantially in software is described below.

7. Software Implementation

Figure 6:
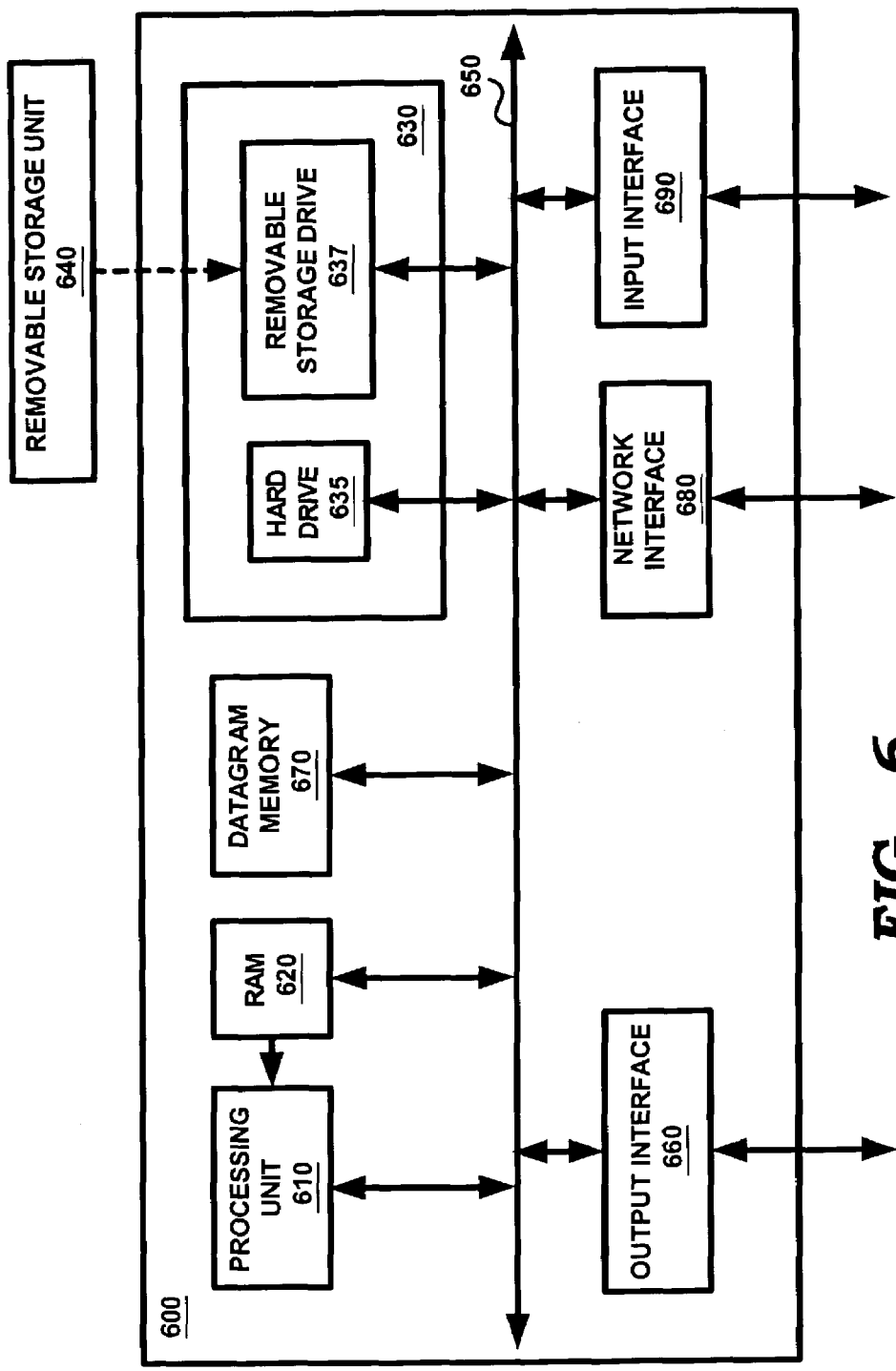
FIG. 6 is a block diagram illustrating the details of an embodiment of a device implemented substantially in the form of software according to an aspect of the present invention.

FIG. 6 is a block diagram illustrating the details of ATM device 600 in one embodiment. ATM device 600 is shown containing processing unit 610, random access memory (RAM) 620, storage 630, output interface 660, packet memory 670, network interface 680, and input interface 690. Each component is described in further detail below.

Output interface 660 provides output signals (e.g., display signals to a display unit, not shown) which can form the basis for a suitable user interface for an administrator to interact with ATM device 600. Input interface 690 (e.g., interface with a key-board and/or mouse, not shown) enables an administrator to provide any necessary inputs to ATM device 600. Output interface 660 and input interface 690 can be used, for example, to enable a network administrator to configure various permanent virtual circuits.

Network interface 680 enables ATM device 600 to send and receive data on communication networks using asynchronous transfer mode (ATM) (in the case of switches and edge routers) and layer-3 protocols (e.g., IP, DECnet, and, Vines protocol well known in the relevant arts) ATM device 600 may be using (in the case of edge router only). Network interface 680, output interface 660 and input interface 690 can be implemented in a known way.

RAM 620, storage 630, and packet memory 670 may together be referred to as a memory. RAM 620 receives instructions and data on path 650 from storage 630, and provides the instructions to processing unit 610 for execution. RAM 620 may be used to support various VC (and forwarding) tables. Accordingly, the QoS parameters in RAM 620 may be changed when the aggregate available bandwidth of ATM device changes.

Packet memory 670 stores (queues) cells (potentially IP packets also in case of edge router 120) received and/or waiting to be forwarded (or otherwise processed) on different ports. Secondary memory 630 may contain units such as hard drive 635 and removable storage drive 637. Secondary storage 630 may store the software instructions and data, which enable ATM device 600 to provide several features in accordance with the present invention.

Some or all of the data and instructions may be provided on removable storage unit 640, and the data and instructions may be read and provided by removable storage drive 637 to processing unit 610 via RAM 620. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620. In general processing unit 610 reads sequences of instructions from various types of memory medium (including RAM 620, storage 630 and removable storage unit 640), and executes the instructions to provide various features of the present invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a virtual circuit in a first ATM device, said virtual circuit being provided through an adjacent ATM device, comprising:

configuring a bandwidth of said virtual circuit to a first value, wherein said first value is associated with a plurality of paths between the devices being operational with said plurality of paths providing an aggregate available bandwidth to said virtual circuit;

determining whether said aggregate available bandwidth along said plurality of paths from said first ATM device to said adjacent ATM device has changed;

changing said bandwidth of said virtual circuit to a second value if said aggregate available bandwidth is determined to have changed, wherein said second value is not equal to said first value;

wherein the second value is computed using at least a first QoS parameter when said aggregate available bandwidth is determined to have changed, and wherein the first QoS parameter comprises a peak cell rate (PCR), the computing including multiplying the first value by a number of active operational paths and dividing by a total number of paths to generate the second value.

2. The method of claim 1, wherein said determining comprises checking whether a status of one of said one or more paths has changed from operational status to non-operational status or vice versa, wherein said bandwidth is changed from said first value to said second value to increase said bandwidth of said virtual circuit if said status has changed from non-operational status to operational status, and to decrease said bandwidth if said status has changed from operational status to non-operational status.

3. The method of claim 1, wherein said first QoS parameter comprises an allocated bandwidth, said computing comprises multiplying said first value by a first factor to generate said second value, wherein said first factor equals (said number of active operational paths/said total number of said plurality of paths) if a sum of allocated configured bandwidth for all of a plurality of virtual circuits (SCB) is greater than an aggregate configured interface bandwidth, wherein said aggregate configured interface bandwidth equals said aggregate available bandwidth when all paths are operational, wherein '/' represents a division operation, wherein said first factor equals AAIB/SCB if SCB is greater than AAIB, wherein AAIB represents a sum of bandwidths of said active operational paths, and wherein said first factor equals 1 if the sum of allocated bandwidth for said plurality of virtual circuits is less than said AAIB.

4. The method of claim 3, wherein said allocated bandwidth comprises each of minimum cell rate (MCR) and sustained cell rate (SCR).

5. The method of claim 3, wherein said first QoS parameter comprises maximum burst size (MBS), which is not changed even if said aggregate available bandwidth on said plurality of paths is determined to have changed.

6. The method of claim 3, wherein said virtual circuit comprises one of unspecified bit rate (UBR), available bit rate (ABR) or variable bit rate (VBR) type.

7. A computer readable medium carrying one or more sequences of instructions for causing a first ATM device to support a virtual circuit, said virtual circuit being provided through an adjacent ATM device, wherein execution of said one or more sequences of instructions by one or more processors contained in said first ATM device causes said one or more processors to perform the actions of:

setting a bandwidth of said virtual circuit to have a first value, wherein said first value is associated with a plurality of paths between the devices being operational with said plurality of paths providing an aggregate available bandwidth to said virtual circuit;

determining whether said aggregate available bandwidth along said plurality of paths from said first ATM device to said adjacent ATM device has changed;

changing said bandwidth of said virtual circuit to have a second value if said aggregate available bandwidth is determined to have changed, wherein said second value is not equal to said first value; and wherein the second value is computed using at least a first QoS parameter when said aggregate available bandwidth is determined to have changed, and wherein the first QoS parameter comprises a peak cell rate (PCR), the computing including multiplying the first value by a number of active operational paths and dividing by a total number of paths to generate the second value.

8. The computer readable medium of claim 7, wherein said determining comprises checking whether a status of one of said one or more paths has changed from operational status to non-operational status or vice versa, wherein said bandwidth is changed from said first value to said second value to increase said bandwidth of said virtual circuit if said status has changed from non-operational status to operational status, and to decrease said bandwidth if said status has changed from operational status IO non-operational status.

9. The computer readable medium of claim 7, wherein said first QoS parameter comprises an allocated bandwidth, said computing comprises multiplying said first value by a first factor to generate said second value, wherein said first factor equals (said number of active operational paths/said total number of said plurality of paths) if a sum of allocated configured bandwidth for all of a Plurality of virtual circuits (SCB) is greater than an aggregate configured interface bandwidth, wherein said aggregate configured interface bandwidth equals said aggregate available bandwidth when all paths are operational, wherein '/' represents a division operation, wherein said first factor equals AAIB/SCB if SCB is greater than AAIB, wherein AAIB represents a sum of bandwidths of said active operational paths, and wherein said first factor equals 1 if the sum of allocated bandwidth for said plurality of virtual circuits is less than said AAIB.

10. The computer readable medium of claim 9, wherein said allocated bandwidth comprises each of minimum cell rate (MCR) and sustained cell rate (SCR).

11. The computer readable medium of claim 9, wherein said aggregate available bandwidth on said plurality of paths is determined to have changed.

12. The computer readable medium of claim 9, wherein said ATM device comprises one of an edge router and a switch.

13. A first ATM device supporting a virtual circuit, said virtual circuit being provided through an adjacent ATM device, said first ATM device comprising:

means for setting a bandwidth of said virtual circuit to have a first value, wherein said first value is associated with a plurality of Paths between the devices being operational with said plurality of paths providing an aggregate available bandwidth to said virtual circuit;

means for determining whether said aggregate available bandwidth along said plurality of paths from said first ATM device to said adjacent ATM device has changed;

means for changing said bandwidth of said virtual circuit to a second value if said aggregate available bandwidth is determined to have changed, wherein said second value is not equal to said first value; and wherein the second value is computed using at least a first QoS parameter when said aggregate available bandwidth is determined to have changed, and wherein the first QoS parameter comprises a peak cell rate (PCR), the computing including multiplying the first value by a number of active operational paths and dividing by a total number of paths to generate the second value.

14. The first ATM device of claim 13, wherein said means for determining checks whether a status of one of said one or more paths has changed from operational status to non-operational status or vice versa, wherein said bandwidth is changed from said first value to said second value to increase said bandwidth of said virtual circuit if said status has changed from non-operational status to operational status, and to decrease said bandwidth if said status has changed from operational status to non-operational status.

15. The first ATM device of claim 13, wherein said first QoS parameter comprises an allocated bandwidth, said means for computing multiplying said first value by a first factor to generate said second value, wherein said first factor equals (said number of active operational paths/said total number of said plurality of paths) if a sum of allocated configured bandwidth for all of a plurality of virtual circuits (SCB) is greater than an aggregate configured interface bandwidth, wherein said aggregate configured interface bandwidth equals said aggregate available bandwidth when all paths are operational, wherein '/' represents a division operation, wherein said first factor equals AAIB/SCB if SCB is greater than AAIB, wherein AAIB represents a sum of bandwidths of said active operational paths, and wherein said first factor equals 1 if the sum of allocated bandwidth for said plurality of virtual circuits is less than said AAIB.

16. The first ATM device of claim 15, wherein said allocated bandwidth comprises each of minimum cell rate (MCR) and sustained cell rate (SCR).

17. The first ATM device of claim 15, wherein said first QoS parameter comprises maximum burst size (NIBS), which is not changed even if said aggregate available bandwidth on said plurality of paths is determined to have changed.

18. The first ATM device of claim 15, wherein said virtual circuit comprises one of unspecified bit rate (UBR), available bit rate (ABR) or variable bit rate (VBR) type.

19. The first ATM device of claim 15, wherein said first ATM device comprises one of an edge router and a switch.

* * * * *